United States Patent Office 3,472,350
Patented Oct. 14, 1969

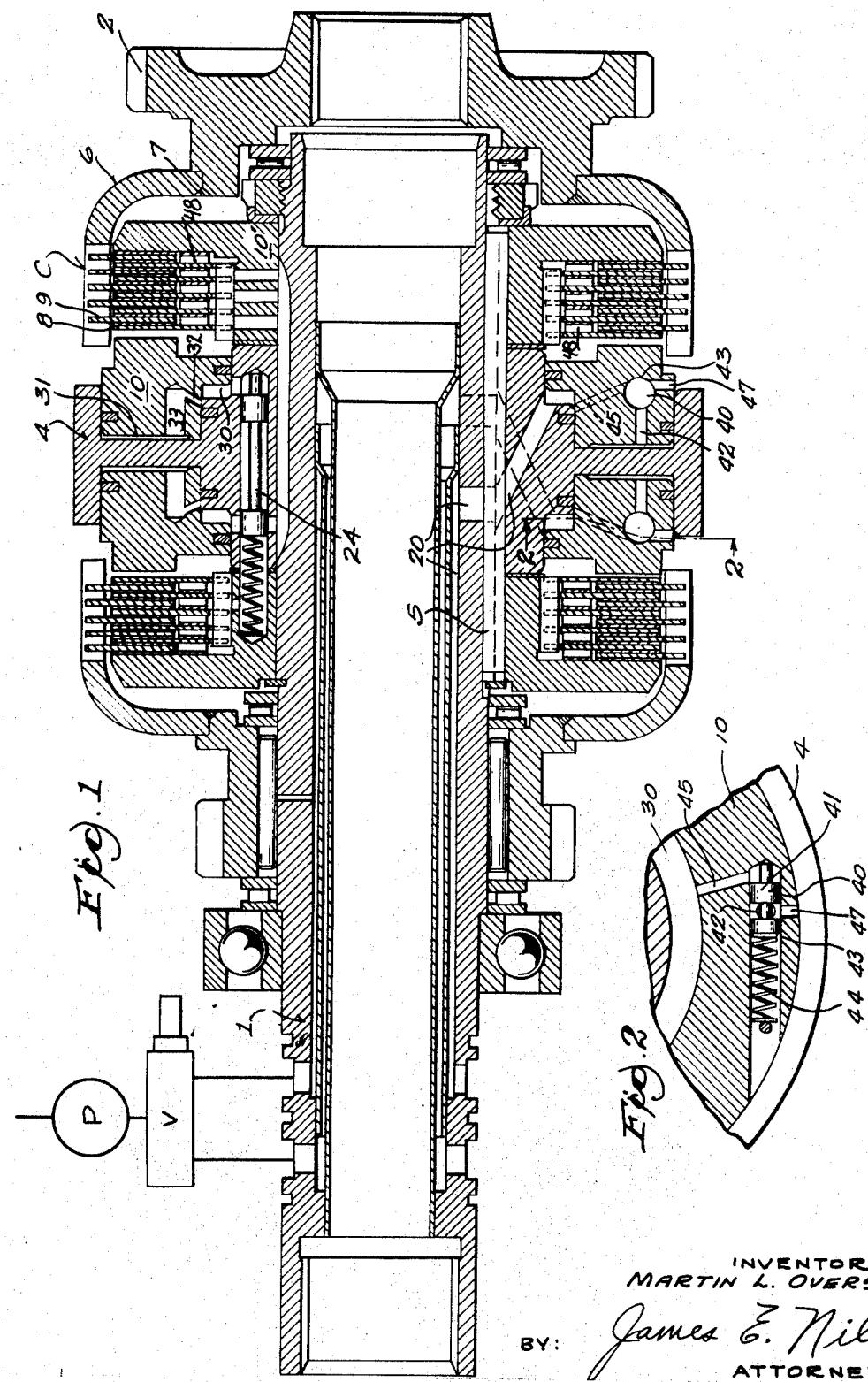

---

3,472,350
HYDRAULICALLY OPERATED FRICTION CLUTCH OF THE DUAL ACTUATING CHAMBER TYPE HAVING A SEQUENCING VALVE
Martin Lee Overson, Racine, Wis., assignor to Twin Disc, Incorporated, Racine, Wis., a corporation of Wisconsin
Filed Jan. 19, 1968, Ser. No. 699,141
Int. Cl. F16d 21/08, 25/063
U.S. Cl. 192—87.15          4 Claims

ABSTRACT OF THE DISCLOSURE

Hydraulically actuated friction clutch mechanism of the type having a "stepped" piston and cylinder which define dual actuating chambers. One of the chambers is smaller and acts first to move the piston toward the plate engaging position. A fluid feed passage is provided in the piston and between the two chambers to provide a controlled rate of flow between and sequential pressurization of said chambers; a bleed passage and sequencing valve in the piston permit entry of air through the sequencing valve and into the larger chamber when the larger chamber is initially filling, to prevent a formation of vacuum therein and to provide a cushion of air, the bleed passage and valve subsequently permit rapid fluid dumping when the clutch is to be disengaged.

FIELD OF THE INVENTION

This invention pertains to hydraulically actuated clutches of the type having sequentially pressurized, dual actuating chambers for each clutch.

DESCRIPTION OF THE PRIOR ART

The present invention is in the nature of an improvement over the clutches shown in the U.S. Patents 3,262,531 issued July 26, 1966, to Black et al.; 3,243,026 issued Mar. 29, 1966, to Snoy et al.; and 3,245,507 issued Apr. 12, 1966, to Hilpert. The invention eliminates considerable valving found in the prior art and permits entry of air into the main actuating chamber when the latter is initially filling with actuating fluid, providing a cushioning effect; and permits rapid dumping of the main chamber when the clutch is to be disengaged.

SUMMARY OF THE INVENTION

The present invention provides an improved hydraulically actuated friction clutch of the type having sequentially pressurized, dual actuating chambers, one of which is smaller and pressurized first to commence piston movement. Fluid is then directed from this first chamber through a feed passage located in the piston and into the larger main actuating chamber. A bleed passage in the piston permits entry of air through a sequence valve and into the main cylinder when the latter is initially being pressurized with fluid thus preventing vacuum formation and also providing a cushioning plate clamp-up action; when pressure builds up sufficiently, the valve closes the air passage; and the bleed passage and valve also permit fast dumping of fluid from the chamber when the clutch is disengaged.

The present clutch assures immediate and rapid movement of the piston in the clutch engaging direction because of the small capacity of the first, smaller chamber; the fluid feed passage between the chambers delays entry of fluid into the large chamber and thus air is also permitted to rush into the larger chamber through a bleed passage and valve in the piston while the large chamber is initially filling, thus preventing formation of a vacuum in the large chamber and providing a cushioning effect due to the compressibility of the air; when the clutch is to be disengaged, the valve and bleed passage in the piston permit immediate and rapid dumping of the main chamber.

BRIEF DESCRIPTION OF THE DRAWINGS

FIGURE 1 is a longitudinal cross section view of a dual clutch embodying the present invention.
FIGURE 2 is a cross sectional view taken along line 2—2 of a portion in FIGURE 1.

DESCRIPTION OF THE PREFERRED EMBODIMENT

The invention will be shown and described in connection with a dual clutch arrangement, but it should be understood that the invention is applicable to either a single or dual clutch arrangement. Inasmuch as the two clutches shown in the drawing are similar, only one will be described.

In the following description of a duplex clutch which embodies the present invention, reference will be made to a power input member and a power output member, but it should be realized that the power may be transmitted in either direction and it is not the intention to limit this invention to any particular direction of power flow.

Furthermore, as the clutches shown in this duplex clutch are identical, description of only one of them will be made herein.

Power may be transmitted to the clutch through the drive sleeve 1 through the clutch C and and out of the gear member 2. A central, cylindrical and fixed reaction member 4 is fixed to the sleeve 1 by suitable key means 5, while the clutch drum 6 is fixed as by welding at 7 to the output member 2. Conventional interleaved friction plates 8 and 9 are splined, respectively, to the hub 10¹ fixed to sleeve 1 and to the drum 6. A piston 10 is axially slidable within the reaction member 4 and when urged to the right, as viewed in the drawings, the piston causes clamp-up of the interleaved clutch plates and consequent driving engagement between the sleeve 1 and output member 2.

A fluid passage 20 conducts pressure fluid to the hydraulic actuating mechanism, to be described, and this fluid comes from an external source P and selector valve V. A valve mechanism 24 is located in the reaction member and as it forms no part of the present invention, it is believed sufficient to say that it acts to transfer fluid from the clutch being disengaged to the plates of the other clutch which is being engaged for cooling of those plates. If a more complete description is deemed to be either necessary or desirable, reference may be had to the United States Patent No. 3,301,367 which issued on Jan. 31, 1967, to E. C. Yokel.

The reaction cylinder member 4 has a complementary shaped piston 10 slidable therein, together defining dual actuating chambers 30 and 31. Chamber 30 is a smaller chamber and is located radially inward of the larger chamber 31. When the clutch is to be engaged, fluid pressure is directed, via the selector valve V, through passage 20 and into chamber 30. This pressurization of chamber 30 causes the piston 10 to commence movement to the right (as viewed in the drawings) toward the clutch engaging position. This movement uncovers orifice 32 and permits fluid to flow through passage 33 and enter chamber 31. While this chamber 31 is being filled initially, air is also permitted to enter chamber 31 from the atmosphere through a sequencing valve 40 located in piston 10. The valve 40 as shown in FIGURE 2, is of the spool type and has a land 41 in bore 43 which houses the spool. As shown in FIGURE 2, a spring 44 normally biases the spool to the right, that is, to the vent open position where air can enter chamber 31 via ports 47 and 42. During this time, the pressure in chamber 30 is relatively low, say for example, it is 40 p.s.i. This pressure is insufficient to shift the sequencing valve. Release springs 48 are provided between the clutch plates 8 and 9 and may be set to be overcome, say at a pressure of 40 p.s.i.

When pressure builds up sufficiently in chamber 30, for example to 80 p.s.i. after the piston bears against the clutch plates, then fluid pressure in passage 45 causes the valve 40 to shift against the bias of spring 44, thus closing the vent 47 from chamber 31. In this manner, chamber 31 has been partially filled with air before the vent is closed. Full clamp-up then occurs.

When it is desired to release the clutch C, selector valve V is shifted to thereby dump the pressure from the inner, smaller chamber 30. As soon as the pressure is relieved from chamber 30, the spring 44 causes the sequencing valve 40 to shift to the vent open position thereby opening passage 42 leading from chamber 31 to the dump passage 47. With this arrangement, as soon as pressure is relieved from the small chamber 30, the larger chamber 31 is rapidly dumped via passages 42 and 47. Thus, chamber 31 is dumped by the sequencing valve which is responsive to pressure drop in the small chamber 30.

By means of the present invention, a hydraulically actuated friction clutch has been provided, in which the dual actuating chambers are sequentially brought into use. When the larger chamber 31 is being filled initially, air is also being permitted to enter via passages 47 and 42, thereby not only preventing a formation of a vacuum in the large chamber 31, but also providing a cushioning effect due to the relatively compressible air in chamber 31. When sufficient pressure is built up in smaller chamber 30, the vent 47 of chamber 31 is closed permitting complete clamp-up. The same sequencing valve 40 and bleed passages 42 and 47 are then used to dump the large actuating chamber 31 as soon as pressure is relieved from the small chamber 30. A particularly simple, very responsive, and smoothly engaging clutch is thus provided with the present invention.

I claim:

1. A hydraulically actuated friction clutch having a power input element and a power output element with interleaved and disengageable clutch plates therebetween, hydraulic cylinder and piston means between said elements for releasably clamping said clutch plates together, said means comprising; a cylinder member having a complementary shaped piston slidable relative thereto to define therewith dual actuating chambers which are pressurizable to cause piston movement toward a plate clamping position, one of said chambers being located radially inwardly of the other end and constituting a first actuating chamber, fluid supply means for said first chamber, feed passage means placing said chambers in fluid communication with one another whereby fluid is directed into the radially outward chamber from said first actuating chamber, a bleed passage and sequencing valve in said piston for placing said radially outward chamber in communication with the atmosphere via said valve, whereby air can rush into said radially outward chamber during preliminary fluid filling thereof to provide a cushioning effect upon clutch engagement, said valve then being actuable by a rise in pressure in said first chamber to close said bleed passage, and when pressure is relieved from said first actuating chamber the said valve is then biased to open said outward chamber to said bleed passage, thereby dumping said radially outward chamber.

2. The clutch as defined in claim 1 further characterized in that said valve is normally urged to the outward chamber dumping position by spring means.

3. Clutch mechanism having a power input element and a power output element with interleaved and disengagable clutch plates therebetween, hydraulic cylinder and piston means between said elements for releasably clamping said clutch together and comprising; a cylinder member having a complementary shaped piston member slidable relative thereto to define therewith dual actuating chambers which are sequentially pressurizable to cause movement of one of said members toward a plate clamping position, one of said chambers being located radially inwardly of the other and constituting a first actuating chamber, fluid supply means located externally of said clutch and for supplying fluid to said first chamber, feed passage means in one of the members and placing said chambers in fluid communication with one another, whereby after said first actuating chamber commences filling with fluid then fluid is forced into the outward chamber; a bleed passage and pressure operated sequencing valve in said piston member and being normally open to place said outward chamber in communication with the atmosphere to thereby permit air to rush into said outward chamber during preliminary fluid filling thereof and provide a cushioning effect upon clutch engagement, and said valve is shiftable by a pressure rise in said first chamber to a vent closed position to close said bleed passage; and when pressure is relieved from said first actuating chamber the said valve is biased to a vent open position to dump said outward chamber to said bleed passage.

4. The clutch set forth in claim 3 including resilient means for biasing said pressure operated valve to the outward chamber dumping position.

References Cited

UNITED STATES PATENTS

| 2,320,960 | 6/1943 | Wheaton | 192—87.17 XR |
| 2,632,544 | 3/1953 | Hockert | 192—87 |
| 2,740,512 | 4/1956 | Fischer | 192—85 XR |
| 2,864,479 | 12/1958 | Schindler | 192—85 XR |
| 2,925,159 | 2/1960 | Black | 192—85 XR |
| 2,954,040 | 9/1960 | Bolster | 192—85 XR |
| 3,273,415 | 9/1966 | Frost | 74—360 |
| 3,378,111 | 4/1968 | Greer et al. | 192—109 XR |

MARTIN P. SCHWADRON, Primary Examiner

L. J. PAYNE, Assistant Examiner

U.S. Cl. X.R.

192—106, 109